United States Patent [19]

Osei-Gyimah et al.

[11] 4,415,455
[45] Nov. 15, 1983

[54] REVERSE OSMOSIS MEMBRANES BASED ON HYDROXYALKYL METHACRYLATE AND METHACRYLIC ACID COPOLYMERS

[75] Inventors: Peter Osei-Gyimah, North Wales; Peter G. Cartier, Glenside; Paul E. Ellis, Downingtown, all of Pa.

[73] Assignee: Rohm and Haas Company, Philadelphia, Pa.

[21] Appl. No.: 440,417

[22] Filed: Nov. 9, 1982

[51] Int. Cl.³ .............................................. B07C 9/00
[52] U.S. Cl. .................................. 210/654; 427/244; 428/398; 428/500
[58] Field of Search ............... 264/41; 210/500.2, 652, 210/654; 427/244, 393.5; 428/304.4, 306.6, 308.4, 419, 398, 500, 318.4

[56] References Cited

U.S. PATENT DOCUMENTS

| | | | |
|---|---|---|---|
| 3,963,618 | 6/1976 | Muir | 264/41 |
| 3,969,452 | 7/1976 | Ciliberti et al. | 264/41 |
| 4,005,012 | 1/1977 | Wrasidlo | 210/500.2 |
| 4,039,440 | 8/1977 | Cadotte | 264/41 |
| 4,268,463 | 5/1981 | Aoyagi et al. | 264/41 |

*Primary Examiner*—James J. Bell
*Attorney, Agent, or Firm*—Fidelman, Wolffe & Waldron

[57] ABSTRACT

Good salt rejection, flux characteristics and resistance to degradation are obtained with semi-permeable reverse osmosis membranes made by coating a microporous substrate with a copolymer of a hydroxy containing methacrylic ester and methacrylic acid, and crosslinking the copolymer subsequent to deposition on the substrate.

17 Claims, No Drawings

REVERSE OSMOSIS MEMBRANES BASED ON HYDROXYALKYL METHACRYLATE AND METHACRYLIC ACID COPOLYMERS

The Government has rights in this invention pursuant of Contract No. 14-34-0001-0445 awarded by the Department of the Interior (OWRT).

This invention relates to novel reverse osmosis membranes, preferably low pressure reverse osmosis membranes. More specifically, this invention relates to reverse osmosis membranes exhibiting high performance in selective permeability characteristics such as water flux and salt rejection, chemical resistances such as oxidation, acid and alkali resistance, and thermal stability, a process for the production thereof and with the use therof in reverse osmosis.

DESCRIPTION OF THE PRIOR ART

The semi-permeable membrance is a membrane which has selective permeability to specified molecules, and is frequently utilized to remove very small amounts or to reduce to very small amounts undesirable molecules dissolved or diffused in a liquid or a gas.

In recent years, reverse osmosis has attracted a great amount of attention and interest for utilization in fields involving purification of liquids. This is of special importance when utilizing such a system in the purification of water, including brackish and sea water. When utilizing reverse osmosis in the purification of brackish or heavily salinated water such as sea water, a pressure in excess of the osmotic pressure of the brackish water feed solution is applied to the solution, pure water diffusing through the membrane with the sodium chloride molecules or other impurities which may be present in the feed water retained by the membrane.

The efficiency of the reverse osmosis method is greatly affected by the properties of the semi-permeable membrane used, and numerous membranes have appeared in the art relative thereto.

Much effort has been exerted to develop membranes having high performance characteristics and various semi-permeable membranes are now being used in commercial processes for performing separations by the reverse osmosis treatment of aqueous solutions either for the production of relatively pure water or for concentration of a liquid solution being treated or both.

Such semi-permeable membranes which are being used commercially include the early Loeb-type membranes made of cellulose diacetate. These membranes are asymmetric membranes characterized by a very thin, dense surface layer or skin that is supported upon an integrally attached, much thicker supporting layer. These well-known membranes have proven to be less than totally satisfactory in use due to poor compactiion, low resistance to chemical and/or biological degradation, a short useful life, and insufficient flux and salt rejection characteristics.

In attempts to overcome such defects of the cellulose diacetate membranes, a number of membranes composed essentially of synthetic polymeric materials have been proposed.

Among those in use is a composite semi-permeable membrane comprising a microporous substrate and an ultrathin film formed of a cross-linked, grafted polyethyleneimine disposed on one surface thereof, the cross-linking having been effected by the use of isophthaloyl chloride and the graft reactant being such as acrylonitrile or epichlorohydrin.

When preparing such a composite membrane, one of the primary objectives is to tailor both the ultrathin film and the microporous supporting layer in such a manenr that each of the components will possess the most desirable properties.

U.S. Pat. No. 4,005,012 describes a composite semipermeable membrane formed by contacting an aminomodified polyepihalohydrin with a polyfunctional agent on a microporous substrate to form the ultrathin film on one surface of the microporous substrate.

A reverse osmosis membrane prepared in situ by initial formation of a layer of polyethyleneimine on a suitable support, followed by interfacial reaction with a polyfunctional agent to produce a thin film surface coating, possessing salt barrier characteristics, is taught in U.S. Pat. No. 4,039,440. Such membrane exhibits high salt rejection, but has the defect of insufficient water flux and low resistance to oxidation.

Resistance to oxidation is particularly important inasmuch as, when utilizing a semi-permeable membrane in the treatment of brackish water, and particularly in the treatment of waste effluent, it is often necessary to treat the feed material with chlorine or other oxidizing agents to deter bacterial growth which would greatly decrease the performance of the membranes as a result of fouling or the like. However, the inclusion of chlorine in the feed to which the synthetic semi-permeable membranes are exposed results in a substantial diminution of the performance of the membrane.

The acrylonitrile grafted polyethyleneimine semipermeable membrane previously discussed exhibits some improvement in oxidation resistance; however, degradation advances gradually as the membrane is used continuously during a long period of time and moreover, such membranes have the serious defect of possessing a markedly reduced water flux.

Dense films of cross-linked hydroxyethyl methacrylatemethyl methacrylate copolymers have been indicated as possessing intrinsic desalination characteristics. Attempts to produce composite, ultrathin membranes of hydroxyethyl methacrylatemethyl methacrylate copolymers on supports by coating supports with a solution containing the copolymer, to be followed by cross-linking thereof have been unsuccessful due to the fact that the copolymer produced could not be solubilized (U.S. Department of Commerce, NTIS PB Report 253-193, April 1976, page 77). In a companion U.S.D.C. Report (PB 248-670, February 1975, at page 29) it was suggested that emulsion copolymers containing alternating carboxyl and alcohol groups, or their corresponding esters might be utilized to form membranes, with acidic catalysis providing cross-linking by transesterification; however, such systems proved to be unstable and hydrolytically stable systems were not obtained.

It is thus seen that semi-permeable membranes desirably should possess the combination of characteristics of high permselectivity, a high water flux, good resistance to compaction, superior resistance to chemical and biological degradation, and sufficient flexibility to endure shaping into modules for actual use.

The semi-permeable membranes so far made available have lacked one or more of these characteristics and are not entirely satisfactory for use as reverse osmosis membranes.

SUMMARY OF THE INVENTION

It is an object of the present invention to provide a semi-permeable membrane which is free from the defects of presently available reverse osmosis membranes.

Another object of this invention is to provide semi-permeable composite membranes of various configurations, including sheet-like, hollow fiber, tubular and the like having high permselectivity and flux, resistance to compaction, high resistance to chemical and biological degradation, and a superior resistance to oxidation.

Yet another object of the present invention is to provide a process for the production of semi-permeable membranes possessing the desirable properties enumerated.

Other objects and advantages of this invention will become apparent from the following description.

In accordance with the present ivnention permselective reverse osmosis membranes, particularly adapted for use in desalination processes, exhibiting good flux, high salt rejection and high resistance to chemical and biological degradation are produced by providing a composite comprising a microporous substrate and an ultrathin film having semi-permeable properties deposited on one surface of said microporous substrate, the ultrathin film being formed by contacting the substrate with a solution containing a catalyst, a copolymer of methacrylic acid and an ester or amide of methacrylic acid containing a free hydroxyl group on the ester or amide moiety and optionally a polyfunctional carboxylic acid and heating such coated substrate to form the permselective membrane.

Such coatings as are produced are not chemically bound to the substrate, but do penetrate to some degree into the surface thereof to provide a stable composite.

It has been found that the reverse osmosis membranes so produced exhibit high salt rejections, good flux and good resistance to degradation by chlorine attack and/or hydrolysis. The cross-linking by esterification provides a high degree of salt rejection, the carboxyl groups present impart a hydrophilic character to the membrane allowing for good water passage and the absence of easily oxidizable functionality apparently renders the membranes insensitive to chlorine attack in the saline feed stream.

The term "ultrathin" refers to films, membranes or layers having a thickness within the range of from about 0.01 to about 1.0 micron. Thicknesses below about 0.01 microns are difficult to achieve in practice and hence are not ordinarily contemplated for use in ultrathin membrane technology but, theoretically, thinner films deposited on a suitable microporous support could impart salt rejection properties to the film/support composite. Optimum salt and flux properties appear to be obtained in the range of from about 0.05 to about 0.3 microns.

The microporous support may be any of the types conventionally used in reverse osmosis processes. The preferred supports, however, are those prepared from organic polymeric materials such as polysulfones, chlorinated polyvinyl chloride, polyvinyl butyral, polystyrene and the like. Polysulfone film has been found to be a particularly effective support material for the membranes of this invention. Preparation of such films is described in U.S. Pat. Nos. 3,926,798, 3,615,027, and 4,039,440, the disclosures of which are incorporated herein by reference. Preferably, the substrate employed is a polysulfone film reinforced at its back with a woven or non-woven fabric, having an average surface pore size of about 50 to about 5,000 A. As stated, the particular copolymers utilized in producing the film on the microporous substrate are copolymers of methacrylic acid and a hydroxyl bearing methacrylic ester or amide. Suitable esters are those encompassed by the formula

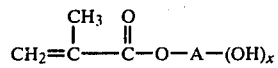

wherein A is alkylene having from 2 to about 4 carbon atoms and x is 1 or 2. The alkylene may be either straight or branched chain in configuration. Preferably, mono-hydroxylated methacrylates are employed.

Exemplary of suitable esters for the purposes of this invention are 2-hydroxyethyl methacrylate, 3-hydroxypropyl methacrylate and the like.

Suitable amides are those encompassed by the formula

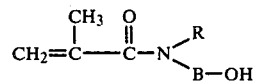

wherein R is alkyl having from 1 to 4 carbon atoms or (BOH) and B is alkylene having from 2 to about 4 carbon atoms, either straight or branched chain in configuration.

The copolymers are prepared by subjecting the reactants to free radical solution polymerization in water. Copolymers produced thereby, useful in membrane fabrication have an average molecular weight, before cure, of from about 1,000 to about 200,000. Particularly useful are those copolymers wherein the weight percent of the hydroxyl-containing component is from about 40 to about 80.

The deposition of a film on the selected microporous supporting substrate can be effected by applying a solution of the copolymer to the support. Suitable solvents include water, lower aliphatic alcohols such as methanol, ethanol, propanol, isopropanol, tert-butanol, acetonitrile and the like, as well as compatible mixtures thereof. Preferably, aqueous solutions of isopropanol or tert-butanol are employed.

Deposition of the copolymer onto the microporous substrate may be effected by immersing the substrate in the copolymer-containing solution at room temperature for a period of from about one to about 30 minutes, preferably from about 5 to about 20 minutes.

To influence salt rejection and flux characteristics of the membrane, polyfunctional carboxylic acids may be added to the solution. Suitable carboxylic acids for this purpose, which may have aromatic or alicyclic structures, are such as pyromellitic acid, 5-sulfoisophthalic acid, 3,3',4,4'-benzophenone tetracarboxylic acid, sulfosuccinic acid, citric acid and pentaerythritol tetrasuccinate, and the like. When utilized, these agents are generally present in the copolymer solution in amounts of from about 0.05 to about 2% by weight, preferably from about 0.1 to about 1.0% by weight.

The cross-linking of the deposited film is accomplished under acid catalysis. Preferably, sulfuric acid is utilized, in amounts of from about 0.5% to about 5% by weight, most preferably 1% by weight. Other acids, such as toluene sulfonic acid, hydrochloric acid and the like, may also be advantageously employed.

Following immersion, the substrate is subjected to drainage, generally for a period of from about 1 to about 5 minutes, a thin coating of polymer solution being retained on the substrate surface.

The thus-coated substrate may be dried at room temperature for a period of from about one minute to about 24 hours, and then subjected to heating at a temperature of from about 80 to about 135° C., preferably from about 100° to about 130° C., for a period of from about 5 to about 60 minutes or longer, dependent upon the substrate employed.

In the Examples which follow, all parts and percentages (except salt rejection) are expressed as by weight unless otherwise indicated. Salt rejection percentages are determined in the conventional manner by conductivity measurements.

EXAMPLE 1

To a 0.64 weight percent solution of a 40:60 hydroxyethyl methacrylate: methacrylic acid copolymer in water containing 20 weight percent tert-butanol, 1.2 weight percent concentrated sulfuric acid was added. A microporous polysulfone substrate was immersed in the solution for 10 minutes. After removal of excess copolymer solution by drainage for 1 minute, the coated substrate was subjected to curing at 115° C. for 20 minutes in a forced-air furnace.

In the reverse osmosis test, a 5000 ppm aqueous solution of sodium chloride feed at 250 psig and 23° C. was employed. The salt rejection was found to be 90% with a water flux of 13 gfd (gallons of product per square foot per day).

EXAMPLE 2

To a 0.34 weight percent solution of 80:20 hydroxyethyl methacrylate: methacrylic acid copolymer in water containing 20 weight percent tert-butanol and 0.6 weight percent concentrated sulfuric acid, 0.5 weight percent of 1,2,4,5-benzene tetracarboxylic acid was added. A microporous polysulfone substrate was coated with the copolymer solution by immersion for 10 minutes and subsequent drainage for 1 minute. The coated substrate was cured at 115° C. for 20 minutes in a forced air furnace.

The membrane exhibited a 88% salt rejection and a 5.1 gfd flux when subjected to testing as in Example 1.

EXAMPLE 3

Example 2 was repeated with the exception that a 2.0 weight percent of citric acid was employed as the cross-linking agent. When subjected to the reverse osmosis test of Example 1, the membrane exhibited a 91% salt rejection and a 6.3 gfd water flux.

EXAMPLE 4

A composite membrane was produced as in Example 3, but without the addition of citric acid. When subjected to the reverse osmosis test of Example 1, the membrane exhibited a 91% salt rejection and a 10 gfd water flux.

EXAMPLE 5

A composite membrane was produced in accordance with Example 1, with the exception that cure was effected at 130° C. for 60 minutes. Tested as in Example 1, the membrane exhibited a 94% salt rejection and a 4 gfd water flux.

EXAMPLE 6

A membrane device was produced by coating a copolymer on the inside of a hollow fiber.

Hollow fibers were prepared and potted into a cartridge. The fibers were coated with an aqueous solution of 0.35 weight percent of a 70:30 hydroxyethyl methacrylate:methacrylic acid copolymer, 20 weight percent isopropanol and 1.5% weight percent concentrated sulfuric acid.

Coating was effected by soaking the fibers in the copolymer solution. Excess solution was allowed to run freely from the fibers. The coated fibers were then cured by blowing hot air through the lumen while the cartridge was heated at 130° C. at 2 psig for 20 minutes.

Tested as in Example 1, the membrane exhibited a 91% salt rejection and a 4 gfd water flux.

The membranes of Examples 1-5 were tested for chlorine resistance by immersion in 100 ppm aqueous chlorine solution, with pH adjustment of the solution effected by adding hydrochloric acid thereto.

| Membrane | pH | Immersion Time, Hrs. | Rejection, % Before | Rejection, % After | Water Flux, gfd Before | Water Flux, gfd After |
|---|---|---|---|---|---|---|
| Ex. 1 | 7 | 72 | 90 | 88 | 13 | 18 |
| Ex. 2 | 7 | 22 | 88 | 78 | 5.1 | 7.1 |
| Ex. 3 | 7 | 72 | 91 | 91 | 6.3 | 10.6 |
| Ex. 4 | 7 | 72 | 91 | 91 | 10 | 10 |
| Ex. 5 | 7 | 72 | 94 | 95 | 4 | 5 |

What is claimed is:

1. A composite material suitable for use as a reverse osmosis membrane comprising a microporous substrate and, supported thereon, a thin, water-permeable desalinizing film, said desalinizing film comprising a copolymer of methacrylic acid and a hydroxy-containing monomer selected from

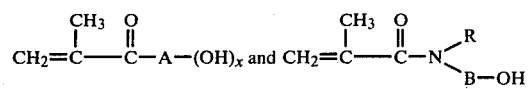

wherein R is alkyl of 1 to 4 carbon atoms or BOH, A and B are alkylene having from 2 to about 4 carbon atoms, and x is 1 or 2, said film crosslinked by acid catalyzed ester formation.

2. A composite material as defined by claim 1 wherein the desalinizing film further contains a polyfunctional carboxylic acid.

3. A composite material as defined by claim 1, wherein said hydroxy-containing monomer is 2-hydroxyethyl methacrylate.

4. A composite material as defined by claim 1, wherein said microporous substrate is a polysulfone film.

5. A composite material as defined by claim 1, wherein said microporous substrate is a hollow fiber substrate.

6. A process for the production of a composite material suitable for use as a reverse osmosis membrane, which comprises applying to a microporous substrate a solution containing an acid catalyst and a copolymer of methacrylic acid and a monomer selected from

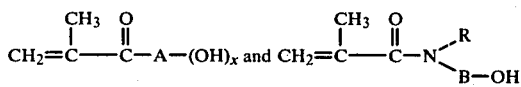

wherein R is alkyl of from 1 to 4 carbon atoms or BOH, A and B are alkylene of from 2 to about 4 carbon atoms and x is 1 or 2;

removing excess solution from said substrate; and heating the coated substrate at a temperature of from about 80° to about 135° C. for a period of at least about 5 minutes to effect cure.

7. A process as defined by claim 6, wherein said solution further contains a polyfunctional carboxylic acid in an amount of from about 0.05 to about 2 percent by weight.

8. A process as defined by claim 6, wherein said microporous substrate is a polysulfone film.

9. A process as defined by claim 6, wherein said microporous substrate is a hollow fiber substrate.

10. In a process for the purification of a liquid, said process comprising contacting said liquid with a reverse osmosis membrane, applying a pressure in excess of the osmotic pressure of said liquid, retaining impurities on said membrane, and recovering purified liquid, the improvement which comprises the utilization of, as said reverse osmosis membrane, a composite material comprising a microporous substrate and supported thereon a thin, liquid permeable film, said film comprising a copolymer of methacrylic acid and a hydroxy-containing monomer selected from

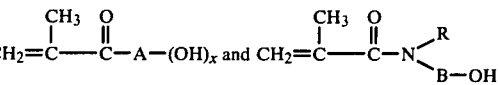

wherein R is alkyl of 1 to 4 carbon atoms or BOH, A and B are alkylene having from 2 to 4 carbon atoms and X is 1 or 2, said film crosslinked by acid catalyzed ester formation.

11. A process as defined by claim 10 wherein said film further contains a polyfunctinal carboxylic acid.

12. A process as defined by claim 10 wherein said hydroxy-containing monomer is 2-hydroxyethyl methacrylate.

13. A process as defined by claim 11 wherein said hydroxy-containing monomer is 2-hydroxyethyl methacrylate.

14. A process as defined by claim 10 wherein said microporous substrate is a polysulfone film.

15. A process as defined by claim 11 wherein said microporous substrate is a polysulfone film.

16. A process as defined by claim 10 wherein said microporous substrate is a hollow fiber substrate.

17. A process as defined by claim 11 wherein said microporous substrate is a hollow fiber structure.

* * * * *

UNITED STATES PATENT AND TRADEMARK OFFICE
CERTIFICATE OF CORRECTION

PATENT NO. : 4,415,455
DATED : November 15, 1983
INVENTOR(S) : PETER OSEI-GYIMAH ET AL.

It is certified that error appears in the above-identified patent and that said Letters Patent is hereby corrected as shown below:

Claims
Column 7, line 3, formula

" 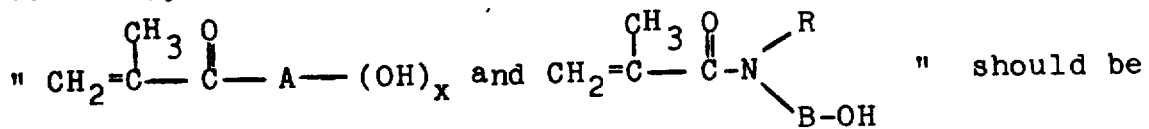 " should be

-- 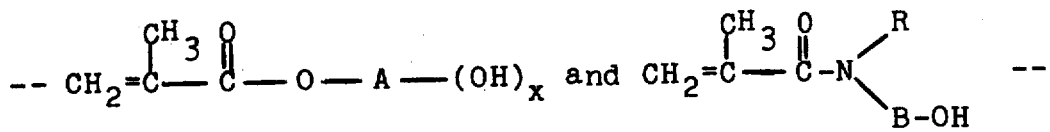 --

Column 8, line 16
"polyfunctinal" should be -- polyfunctional --

Signed and Sealed this

Twenty-eighth Day of February 1984

[SEAL]

Attest:

GERALD J. MOSSINGHOFF

Attesting Officer   Commissioner of Patents and Trademarks